US012423635B2

(12) United States Patent
Rau et al.

(10) Patent No.: US 12,423,635 B2
(45) Date of Patent: Sep. 23, 2025

(54) TECHNOLOGY CHANGE CONFIDENCE RATING

(71) Applicant: Disney Enterprises, Inc., Burbank, CA (US)

(72) Inventors: Jeffrey A. Rau, Celebration, FL (US); Blair K. Martlaro, Belle Isle, FL (US); Steven Harrop, Winter Garden, FL (US); Christopher P. Duran, Polk City, FL (US); Jason J. Isley, Mountlake Terrace, WA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 354 days.

(21) Appl. No.: 17/504,176

(22) Filed: Oct. 18, 2021

(65) Prior Publication Data

US 2023/0120977 A1  Apr. 20, 2023

(51) Int. Cl.
*G06Q 10/0635* (2023.01)
*G06F 11/00* (2006.01)
*G06N 5/04* (2023.01)

(52) U.S. Cl.
CPC ....... *G06Q 10/0635* (2013.01); *G06F 11/008* (2013.01); *G06N 5/04* (2013.01)

(58) Field of Classification Search
CPC .... G06Q 10/0635; G06Q 10/06; G06Q 10/10; G06Q 40/08; G06Q 40/06; G06N 20/00; G06F 16/2379; G06F 21/577; G06F 16/00
See application file for complete search history.

(56) References Cited

U.S. PATENT DOCUMENTS 9,191,380 B2  11/2015  Anderson et al.
11,138,567 B1 * 10/2021  Schmoldt ......... G06Q 10/06393
(Continued)

FOREIGN PATENT DOCUMENTS

JP  2023010181 A  *  1/2023

OTHER PUBLICATIONS

G. Abbott et al., "Risk identification and project health prediction in IT service management," 2010 IEEE Network Operations and Management Symposium—NOMS 2010, Osaka, 2010, pp. 724-733 https://ieeexplore.ieee.org/document/5488375?source=IQplus (Year: 2010).*

*Primary Examiner* — Jerry O'Connor
*Assistant Examiner* — Michael R Koester
(74) *Attorney, Agent, or Firm* — Squire Patton Boggs LLP; Sarah Mirza

(57) ABSTRACT

Techniques for identifying a risk of failure for a planned change to a technology item in a technology infrastructure are disclosed. Historical technology change data are retrieved, including data relating to at least one of: (i) prior technology changes by an implementer or coordinator of the planned change, (ii) a process relating to the planned change, or (iii) prior technology changes relating to the technology item or a related technology item. A change confidence rating for a risk of failure for the planned change is generated, based on the historical technology change data. The change confidence rating is applied, including at least one of: (i) generating a user interface illustrating a risk level for the technology change, (ii) flagging for or initiating a supplemental review of the technology change, or (iii) recommending implementer training relating to the technology change.

16 Claims, 9 Drawing Sheets

(56) References Cited

U.S. PATENT DOCUMENTS

| | | | |
|---|---|---|---|
| 11,620,128 B1* | 4/2023 | Chawda | G06F 8/75 717/120 |
| 2007/0100712 A1* | 5/2007 | Kilpatrick | G06Q 10/06 705/29 |
| 2010/0192195 A1* | 7/2010 | Dunagan | G06F 21/577 726/1 |
| 2016/0357620 A1 | 12/2016 | Beasley | |
| 2017/0178038 A1 | 6/2017 | Guven et al. | |
| 2023/0051921 A1* | 2/2023 | Madala | G06N 20/00 |

* cited by examiner

TECHNOLOGY CHANGE CONFIDENCE RATING

BACKGROUND

Scheduled information technology (IT) changes carry varying levels of risk. For example, some changes are expected to impact large user sets or critical technology infrastructure, and so are likely to be deemed, by an observer (e.g., an IT professional) to have a relatively high risk of failure or negative organizational impact. Other changes are expected to have only a limited impact, and so are likely to be deemed relatively low risk by an observer. These risk assessments are typically based on a human analysis of a limited number of factors, and may be incorrect.

SUMMARY

Embodiments include a method. The method includes identifying a planned change to a technology item in a technology infrastructure. The method further includes retrieving historical technology change data relating to the technology item and the planned change, the historical technology change data including data relating to at least one of: (i) prior technology changes by an implementer or coordinator of the planned change, (ii) a process relating to the planned change, or (iii) prior technology changes relating to the technology item or a related technology item. The method further includes generating a change confidence rating for a risk of failure for the planned change, based on the historical technology change data. The method further includes applying the change confidence rating, including at least one of: (i) generating a user interface illustrating a risk level for the technology change, (ii) flagging for or initiating a supplemental review of the technology change, or (iii) recommending implementer training relating to the technology change.

Embodiments further include a non-transitory computer-readable medium containing computer program code that, when executed by operation of one or more computer processors, performs operations. The operations include identifying a planned change to a technology item in a technology infrastructure. The operations further include retrieving historical technology change data relating to the technology item and the planned change, the historical technology change data including data relating to at least one of: (i) prior technology changes by an implementer or coordinator of the planned change, (ii) a process relating to the planned change, or (iii) prior technology changes relating to the technology item or a related technology item. The operations further include generating a change confidence rating for a risk of failure for the planned change, based on the historical technology change data. The operations further include applying the change confidence rating, including at least one of: (i) generating a user interface illustrating a risk level for the technology change, (ii) flagging for or initiating a supplemental review of the technology change, or (iii) recommending implementer training relating to the technology change.

Embodiments further include a system, including a computer processor and a memory having instructions stored thereon which, when executed on the computer processor, performs operations. The operations include identifying a planned change to a technology item in a technology infrastructure. The operations further include retrieving historical technology change data relating to the technology item and the planned change, the historical technology change data including data relating to at least one of: (i) prior technology changes by an implementer or coordinator of the planned change, (ii) a process relating to the planned change, or (iii) prior technology changes relating to the technology item or a related technology item. The operations further include generating a change confidence rating for a risk of failure for the planned change, based on the historical technology change data. This includes providing the historical technology change data to a trained machine learning (ML) model, and in response receiving from the ML model an inference of the change confidence rating, wherein the ML model is trained using data relating to past technology changes in the technology infrastructure. The operations further include applying the change confidence rating, including at least one of: (i) generating a user interface illustrating a risk level for the technology change, (ii) flagging for or initiating a supplemental review of the technology change, or (iii) recommending implementer training relating to the technology change.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
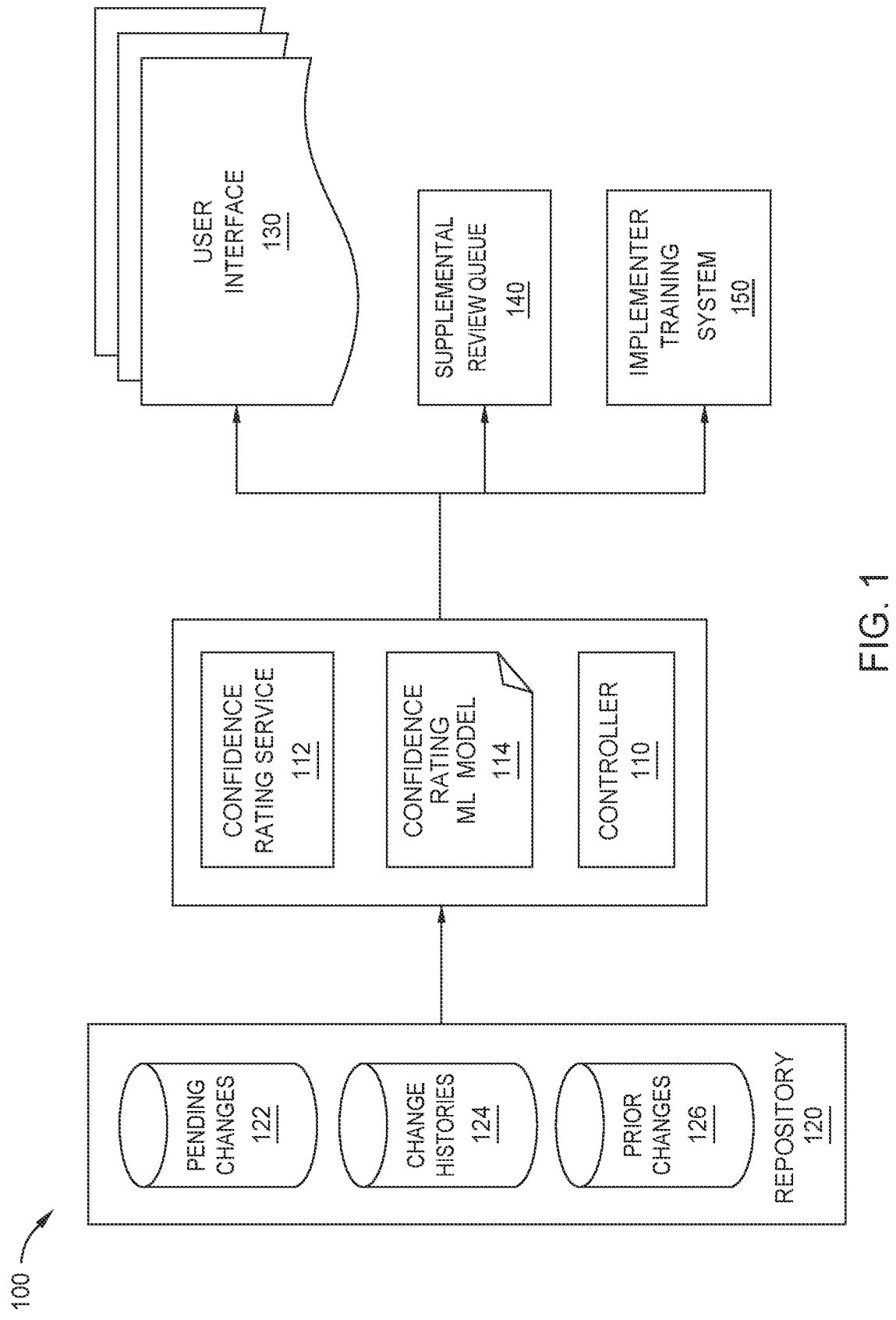
FIG. 1 illustrates a computing environment for generating and applying a technology change confidence rating, according to one embodiment.

As defined in the present application, the terms "automation," "automated," and "automating" refer to systems and processes that do not require the participation of a human user, such as a human system administrator. Although in some implementations a human system administrator may review the performance of the systems and methods disclosed herein, that human involvement is optional. Thus, the processes described in the present application may be performed under the control of hardware processing components of the disclosed systems.

As defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks. In some embodiments, the neural network(s) may be a deep learning neural network that utilizes multiple hidden layers between input and output layers, which may allow for learning based on features not explicitly defined in raw data.

In an embodiment, proposed technology changes can be treated differently based on the expected level of risk of the change. For example, high risk changes can be subjected to a higher level of scrutiny than low or medium risk changes, and can undergo additional review and implementation processes. But, as discussed above, risk assessments for technology changes are typically based on a human analysis of a limited number of factors, and may be incorrect. For example, a reviewer could identify a given proposed technology change as a low risk, or medium risk, change, when the proposed technology change actually represents a high risk that the change will fail or cause an incident.

In an embodiment, this can be improved by automatically rating technology changes (e.g., hardware or software changes to an IT infrastructure) for potential risk. For example, automated techniques can be used to analyze upcoming technology change requests and to determine a change confidence rating that the scheduled change will be successful (e.g., will not cause a negative impact—such as system outages, improper workflows, or degraded business offerings). In an embodiment, historical data relating to a given scheduled technology change can be used to determine this change confidence rating. This is discussed further with regard to FIGS. 3-7. In an embodiment, all proposed technology changes can be evaluated for potential risk. Alternatively, only proposed technology changes initially identified as low, or medium, risk (e.g., by a human analysis) can be evaluated for potential risk.

For example, historical information relating to an implementer of the technology change can be used to determine the change confidence rating (e.g., historical information for the particular implementer, the implementer's business group, a coordinator of the change, or a business group for the coordinator of the change). This is discussed further below with regard to FIG. 5. As another example, historical information relating to a technology change process can be used to determine the change confidence rating (e.g., historical information for an approval group for the change or for a coordinator of the change). This is discussed further below with regard to FIG. 6. As a further example, historical information relating to the technology being changed can be used to determine the change confidence rating (e.g., historical information for the hardware or software being changed, or for related hardware or software). This is discussed further below with regard to FIG. 7.

In an embodiment, this historical information can be used to directly generate a change confidence rating for a given change. This is discussed further below with regard to FIG. 4A. Alternatively, or in addition, this historical information can be used by a suitable machine learning (ML) model (e.g., a deep learning neural network) to generate the change confidence rating. For example, historical change information relating to past changes can be used to train a suitable ML model, and then a trained, supervised, ML model can be used to infer a change confidence rating for a future scheduled change. This is discussed further below with regard to FIG. 4B.

In an embodiment, the change confidence rating can be used for many purposes. For example, the change confidence rating can be used to identify and flag high-risk scheduled changes. These high-risk changes can be presented on a suitable user interface for planning and analysis. For example, the high risk changes could be scheduled for an appropriate time, further evaluated to ensure that the change is planned appropriately, and monitored to improve the chances of success. As another example, the change confidence ratings can be used to improve employee training (e.g., for IT professionals). A low change confidence rating for a given change could indicate lack of training for the implementer or coordinator, and could be used to identify employees that would benefit from additional training, thereby assisting the employee and improving the chances of success for future changes implemented or coordinated by that employee.

One or more of the techniques described herein can have numerous technical advantages. For example, one or more of these techniques can be used to accurately identify high risk planned technology changes. This can both avoid IT downtime and incidents from lack of scrutiny of planned technology changes inaccurately identified as low or medium risk, and avoid waste of compute resources from unnecessary scrutiny of planned technology changes inaccurately identified as high risk. For example, as described above, planned technology changes identified as high risk can undergo additional scrutiny or review processes. Accurately identifying high risk technology changes that have been incorrectly identified as low or medium risk (e.g., by human reviewers) allows for needed additional scrutiny of these changes. This avoids IT downtime and incidents and improves the efficiency of technology operations. Further, accurately identifying high risk technology changes avoids unnecessary additional scrutiny for changes that are actually low or medium risk (e.g., changes incorrectly identified as high risk by human reviewers). In an embodiment, this additional scrutiny can be performed using automated systems, and can require significant compute resources. Avoiding unnecessary additional scrutiny can reduce the necessary compute resources and can result in more efficient, and less computationally wasteful, operation.

FIG. 1 illustrates a computing environment 100 for generating and applying a technology change confidence rating, according to one embodiment. A controller 110 includes a confidence rating service 112 (e.g., a software application executable on a computer processor, as described further below in relation to FIG. 2). In an embodiment, the confidence rating service 112 generates a change confidence rating for a given technology change (e.g., an IT change) using information about the change. For example, the confidence rating service 112 can retrieve pending changes 122 (e.g., planned changes) from a repository 120. In an embodiment, the repository 120 can be any suitable storage location, including an electronic database (e.g., a relational database, a graph database, or any other suitable electronic database), a distributed network storage location (e.g., a public-cloud, private-cloud, or hybrid-cloud storage location), a network accessible remote storage location, a local storage location, or any other suitable storage.

In an embodiment, the pending changes 122 can include details relating to the pending changes, including one or more of identifying a coordinator and/or coordinator group for the change, identifying an implementer and/or implementer group for the change, identifying an approval group for the change, identifying the technology item being changed (e.g., a particular item of hardware or software being added, removed, replaced, or upgraded), or identifying related technology items to the item being changed. This is discussed further below with regard to FIGS. 5-7. These are merely examples, and the confidence rating service 112 can use any suitable pending change information.

In an embodiment, the confidence rating service 112 can further retrieve change histories 124. For example, the confidence rating service 112 can further retrieve historical information relating to the one or more of the identified coordinator and/or coordinator group for the change, the identified implementer and/or implementer group for the change, the identified approval group for the change, the identified technology item being changed, or the identified related technology items to the item being changed. This is discussed further below with regard to FIGS. 5-7. These are again merely examples, and the confidence rating service 112 can use any suitable change history information.

In an embodiment, the confidence rating service 112 can use the retrieved pending changes 122 and change histories 124 to calculate a change confidence rating. For example, the confidence rating service 112 can calculate a score relating to an implementer component, a process component, and a technology component, for each pending change. The confidence rating service 112 can apply suitable weights to the various scores, and score components, to generate a change confidence rating. This is discussed further below with regard to FIG. 4A.

Alternatively, or in addition, the confidence rating service 112 can use a confidence rating ML model 114 to infer a change confidence rating from the pending changes 122 and the change histories 124. For example, the confidence rating ML model 114 can be a suitable supervised ML model (e.g., a neural network). The confidence rating service 112 can use prior changes 126 to train the confidence rating ML model. This is discussed further with regard to FIG. 4B, below. In an embodiment, the change histories 124 and the prior changes 126 include at least partially overlapping data. For example, the change histories 124 can include historical information relating to the pending changes 122 (e.g., historical information for coordinates, implementers, and technologies used in the pending changes 122). The prior changes 126 can include records of the success or failure of prior changes, including attributes of the changes.

In an embodiment, the confidence rating service 112 generates a change confidence rating for some, or all, of the pending changes 122. These change confidence ratings can be used for numerous purposes. For example, the confidence rating service 112 (or any other suitable service) can generate a suitable user interface 130 to present the change confidence ratings to a user (e.g., a system administrator). For example, the user interface 130 can provide numeric change confidence ratings (e.g., number scores), percentage change confidence ratings, confidence intervals, or any suitable information.

Further, the user interface 130 can present to the user categorized change confidence ratings. For example, the user interface can assign a color to different levels of change confidence ratings, and can present the colors to a user. A change confidence rating indicating a high risk change could be categorized as red, a change confidence rating indicating a medium risk change could be categorized as yellow, and a change confidence rating indicating a low risk change could be categorized as green. The level of risk (e.g., high, medium, or low) could be determined by comparing a confidence rating for a change to threshold values, performing statistical calculations with the change confidence ratings (e.g., mean and standard deviations), or in any other suitable manner. For example, the confidence rating service 112 can identify statistical properties (e.g., mean, median, standard deviation) for all changes from a particular implementer, coordinator, group, hardware, or software, or for all changes overall, and could identify the level of risk for a given change confidence rating based on these statistical properties. In an embodiment, presenting a user with categorized change confidence ratings allows the user to assess the risk level of various pending changes quickly, and accurately. Using colors is merely one example, and the change confidence ratings can be presented on the user interface 130 in any suitable way.

In an embodiment, the user interface 130 can also present information about the underlying factors that impacted the ultimate change confidence rating. For example, the user interface 130 can identify what aspects of the pending change, or change history, had the most significant impact on the change confidence rating (e.g., whether the coordinator, implementer, or technology had the most impact, or what historical information had the most impact). In an embodiment, the user interface 130 can be tailored for different end users or user preferences. For example, the user interface 130 could provide an IT administrator with more granular data and an executive with higher-level summary data. The user interface 130, or any other suitable service or component, can dynamically determine the information to provide (e.g., based on a user accessing the user interface), or can be statically configured to provide particular information (e.g., using configuration files or configurable hyper-parameters).

In an embodiment, the change confidence rating can also be used for supplemental review using a supplemental review queue 140. For example, a change with a change confidence rating indicating a high level of risk could be automatically flagged and queued for supplemental review in the supplemental review queue 140. In an embodiment, a human (e.g., an IT administrator) could be provided with the details of the change and tasked with a supplemental review (e.g., to improve the change, schedule the change for a less risky time or less risky user group, or modify the change in any other suitable fashion). Alternatively, or in addition, the pending change could undergo automatic supplemental review. For example, an additional ML model (e.g., a supervised ML model) could be trained to provide suggested modifications for the pending change. These suggested modifications could be implemented automatically, or presented to a human reviewer (e.g., an IT administrator) to assist the review in modifying the pending change. As another example, a change with a change confidence rating indicating a high level of risk could automatically trigger an alert (e.g., an e-mail or SMS message, another form of electronic message, a phone call, or any other alert).

In an embodiment, the change confidence rating can also be used for improved implementer training using the implementer training system 150. In an embodiment, a change confidence rating indicating a low level of risk can indicate that an implementer (e.g., an IT professional implementing or coordinating the change) could benefit from additional training relating to the change. The confidence rating service 112 can initiate additional training using the implementer training system 150. For example, the confidence rating service 112 can use the implementer training system 150 to automatically select additional training (e.g., video or interactive training courses) for the implementer (e.g., based on the technology being changed), and can provide the implementer with the recommended additional training. As another example, the confidence rating service 112 can use the implementer training system 150 to notify the implementer, the implementer's manager, a training group, or any other suitable entity that training is recommended and/or recommend resources where training may be obtained.

In an embodiment, the computing environment 100 can be implemented using any suitable combination of physical compute systems, cloud compute nodes and storage locations, or any other suitable implementation. For example, the controller 110 and repository 120 could be implemented using a server or cluster of servers. As another example, the controller 110 and repository 120 can be implemented using a combination of compute nodes and storage locations in a suitable cloud environment. For example, one or more of the components of the controller 110 and repository 120 can be implemented using a public cloud, a private cloud, a hybrid cloud, or any other suitable implementation.

While FIG. 1 is described in terms of generating confidence ratings for technology changes, this is merely one example. The techniques described in FIGS. 1-7 can be used for confidence ratings for any suitable environment, including vendor management, fulfillment, data source management, and any other suitable environment.

Figure 2:
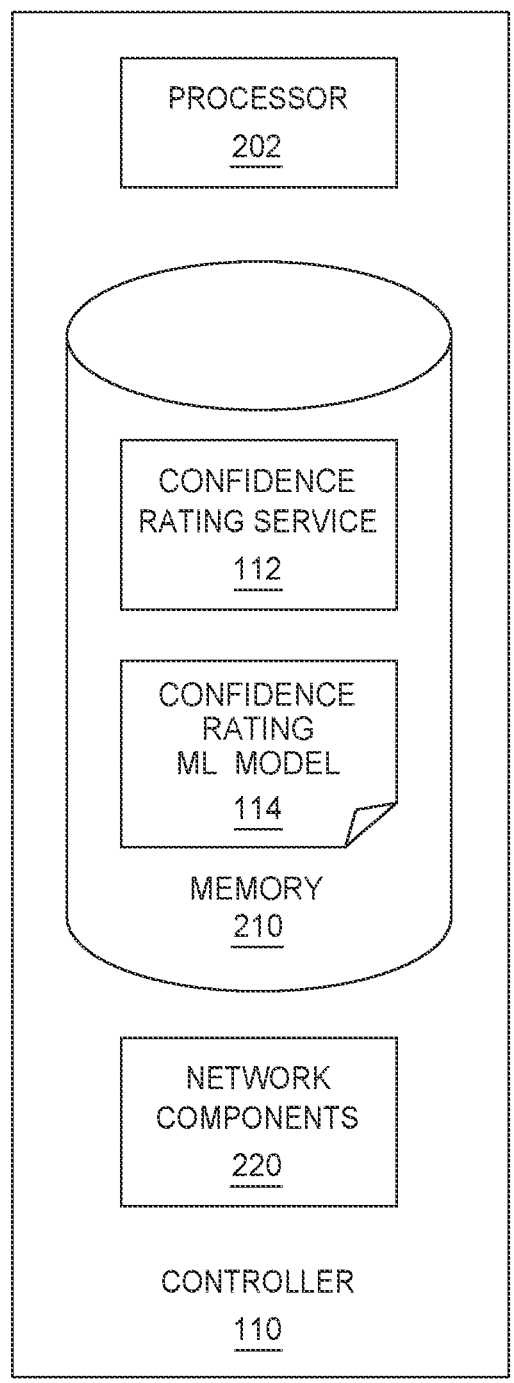
FIG. 2 is a block diagram illustrating a controller for generating and applying a technology change confidence rating, according to one embodiment.

FIG. 2 is a block diagram illustrating a controller 110 for generating and applying a technology change confidence rating, according to one embodiment. The controller 110 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the controller 110 to interface with a suitable communication network (e.g., a communication network interconnecting various components of the computing environment 100 illustrated in FIG. 1, or interconnecting the computing environment 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the controller 110. The program code is generally described as various functional "applications" or "modules" within the memory 210, although alternate implementations may have different functions and/or combinations of functions. Within the memory 210, the confidence rating service 112 facilitates generating a change confidence rating for pending changes. This is discussed further below with regard to FIGS. 3 and 4A. The confidence rating ML model 114 is an ML model trained to infer a change confidence rating from pending, and historical, change information. This is discussed further below with regard to FIG. 4B.

While the controller 110 is illustrated as a single entity, in an embodiment, the various components can be implemented using any suitable combination of physical compute systems, cloud compute nodes and storage locations, or any other suitable implementation. For example, the controller 110 could be implemented using a server or cluster of servers. As another example, the controller 110 can be implemented using a combination of compute nodes and storage locations in a suitable cloud environment. For example, one or more of the components of the controller 110 can be implemented using a public cloud, a private cloud, a hybrid cloud, or any other suitable implementation.

Although FIG. 2 depicts confidence rating service 112 and confidence rating ML model 114 as being mutually co-located in memory 210, that representation is also merely provided as an aid to conceptual clarity. More generally, controller 110 may include one or more computing platforms, such as computer servers for example, which may be co-located, or may form an interactively linked but distributed system, such as a cloud-based system, for instance. As a result, processor 202 and memory 210 may correspond to distributed processor and memory resources within the computing environment 100. Thus, it is to be understood that confidence rating service 112 and confidence rating ML model 114 may be stored remotely from one another within the distributed memory resources of the computing environment 100.

Figure 3:
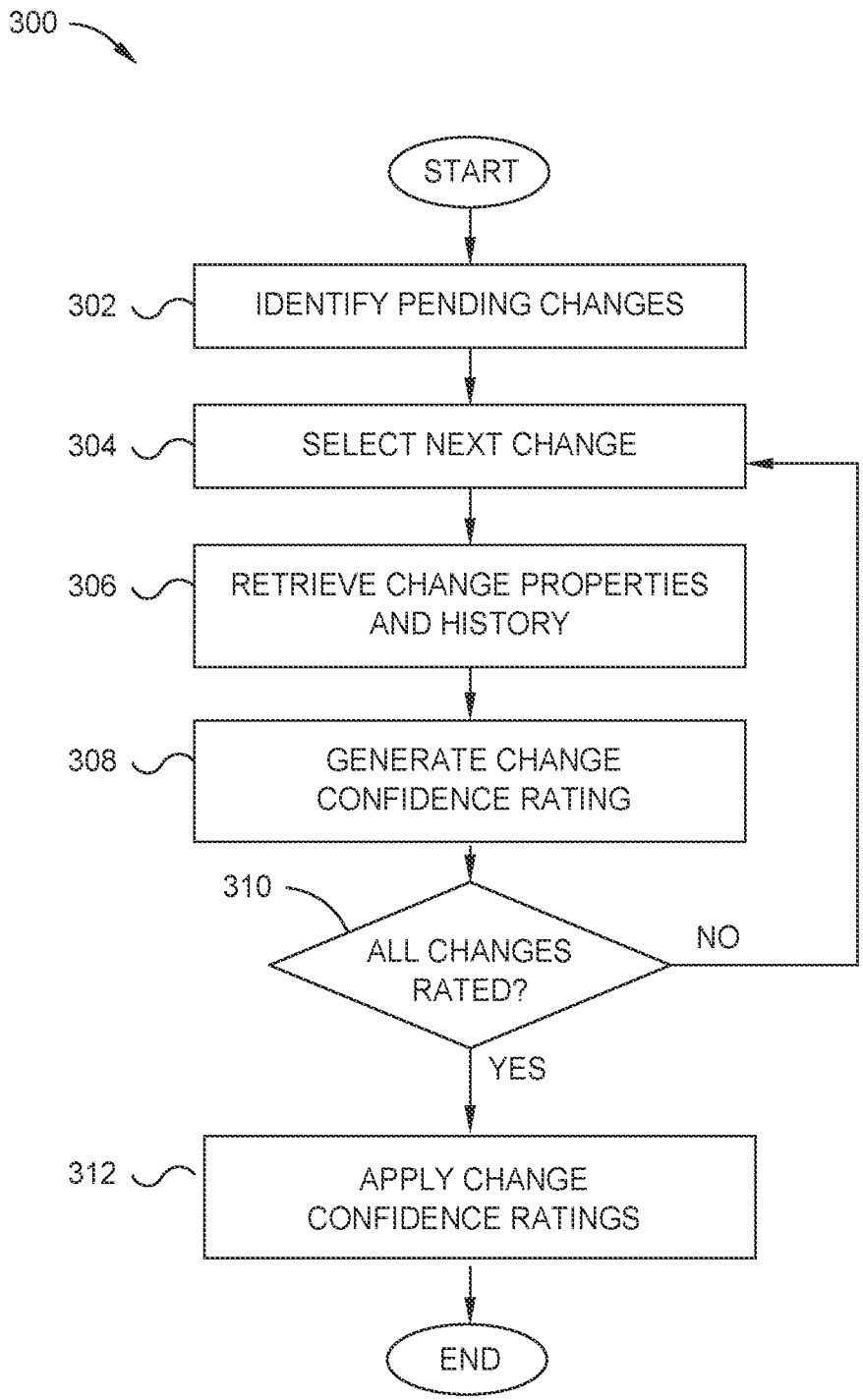
FIG. 3 is a flowchart illustrating an exemplary method for generating and applying a technology change confidence rating, according to one embodiment.

FIG. 3 is a flowchart 300 illustrating an exemplary method for generating and applying a technology change confidence rating, according to one embodiment. At block 302 a confidence rating service (e.g., the confidence rating service 112 illustrated in FIGS. 1-2) identifies pending changes. For example, an organization or entity can have a list, or schedule, of pending technology changes (e.g., upcoming IT changes). This can be maintained in a suitable storage location (e.g., the repository 120 illustrated in FIG. 1).

In an embodiment, the confidence rating service can identify all pending changes. Alternatively, or in addition, the confidence rating service can identify pending changes for a given time horizon (e.g., 7 days, 14 days, 30 days, 60 days, or any other suitable time horizon). These are merely examples, and the confidence rating service can identify any suitable subset of pending changes.

For example, the confidence rating service can identify only changes that have been previously categorized as low or medium risk (e.g., not high risk). In an embodiment, an entity adding technology changes to the pending changes (e.g., an IT administrator) can manually, or automatically, identify an expected risk for each change. Pending changes marked as high risk can automatically undergo supplemental review or be flagged for supplemental review (e.g., as discussed above in relation to the supplemental review queue 140 illustrated in FIG. 1). But pending changes initially marked as low or medium risk (e.g., by the IT administrator) may not automatically undergo or be flagged for supplemental review. For example, it may be overly burdensome for an organization to undertake supplemental review on changes that represent only a medium or low risk. The confidence rating service can select low or medium risk pending changes, and generate a change confidence rating to identify changes that should instead be marked as high risk (e.g., as discussed below with regard to blocks 304-312). These newly identified high risk changes can then also undergo supplemental review. In an embodiment, changes previously identified as low or medium risk that would benefit from supplemental review are identified, without overly burdening an organization by requiring unnecessary supplemental review of all low or medium risk changes.

At block 304, the confidence rating service selects the next change. For example, the confidence rating service can select the next change from the list, or schedule, of pending changes identified at block 302 (e.g., the next change that the confidence rating service has not yet analyzed). Block 304 illustrates selecting the next change sequentially from the pending changes identified at block 302, but this is merely one example. Alternatively, or in addition, the confidence rating service can select any change, or subset of changes, in any order, from the pending changes identified at block 302. Further, in an embodiment, the confidence rating service selects multiple changes at the same time (e.g., in parallel).

At block 306, the confidence rating service retrieves one or more change properties and/or change histories. In an embodiment, the confidence rating service can retrieve properties relating to the change selected at block 304. The confidence rating service can retrieve these properties from any suitable storage location (e.g., the pending changes 122 in the repository 120 illustrated in FIG. 1). The change properties can include any suitable information about the change, including coordinator properties, implementer properties, process properties, and technology properties. This is discussed further below with regard to FIGS. 4-7.

In an embodiment, the confidence rating service can additionally, or instead, retrieve change history information relating to the change selected at block 304. The confidence rating service can retrieve the change history information from any suitable storage location (e.g., the change histories 124 in the repository 120 illustrated in FIG. 1). The change history information can include any suitable historical information about the change, including historical coordinator information, historical implementer information, and historical technology information. This is discussed further below with regard to FIGS. 4-7.

At block 308, the confidence rating service generates a change confidence rating. In an embodiment, the confidence rating service can generate a change confidence rating for the change selected at block 304, using the change properties and/or change history retrieved at block 306. For example, the confidence rating service can calculate an implementer component, a process component, and a technology component, using the change properties and history retrieved at block 306. The confidence rating service can use these components to generate the change confidence rating. This is discussed further below with regard to FIG. 4A.

Alternatively, or in addition, the confidence rating service can provide the change properties and history retrieved at block 306 to a suitable ML model (e.g., the confidence rating ML model 114 illustrated in FIGS. 1-2). The confidence rating service can use the ML model to infer a change confidence rating from the change properties and history. This is discussed further below with regard to FIG. 4B.

At block 310, the confidence rating service determines whether all changes have been rated. In an embodiment, the confidence rating service determines whether a change confidence rating has been generated for each pending change identified at block 302. If not, the flow returns to block 304 and the confidence rating service selects the next change. If so, the flow proceeds to block 312.

At block 312, the confidence rating service applies the change confidence ratings. In an embodiment, the confidence rating service applies the change confidence ratings generated at block 308. For example, the confidence rating service can display the change confidence ratings in a suitable user interface (e.g., the user interface 130 illustrated in FIG. 1). As another example, the confidence rating service can use the change confidence ratings to schedule high risk changes for automatic, or manual, supplemental review (e.g., using the supplemental review queue 140 illustrated in FIG. 1). As another example, the confidence rating service can use the change confidence ratings to provide or recommend training (e.g., for IT professionals, as discussed above in relation to the implementer training system 150 illustrated in FIG. 1).

In an embodiment, FIG. 3 illustrates an exemplary method for generating a change confidence rating for all identified pending changes prior to applying the change confidence ratings (see block 310). This is merely one example. Alternatively, or in addition, the confidence rating service can apply some of the change confidence ratings before generating change confidence ratings for all pending changes. For example, the confidence rating service can apply each change confidence rating after it is generated at block 308, before selecting a next change at block 304. In other words, it is not necessary for all changes to be rated before a change confidence rating for a first change (generated in block 308) can be applied to the first change (block 312).

Figure 4A:
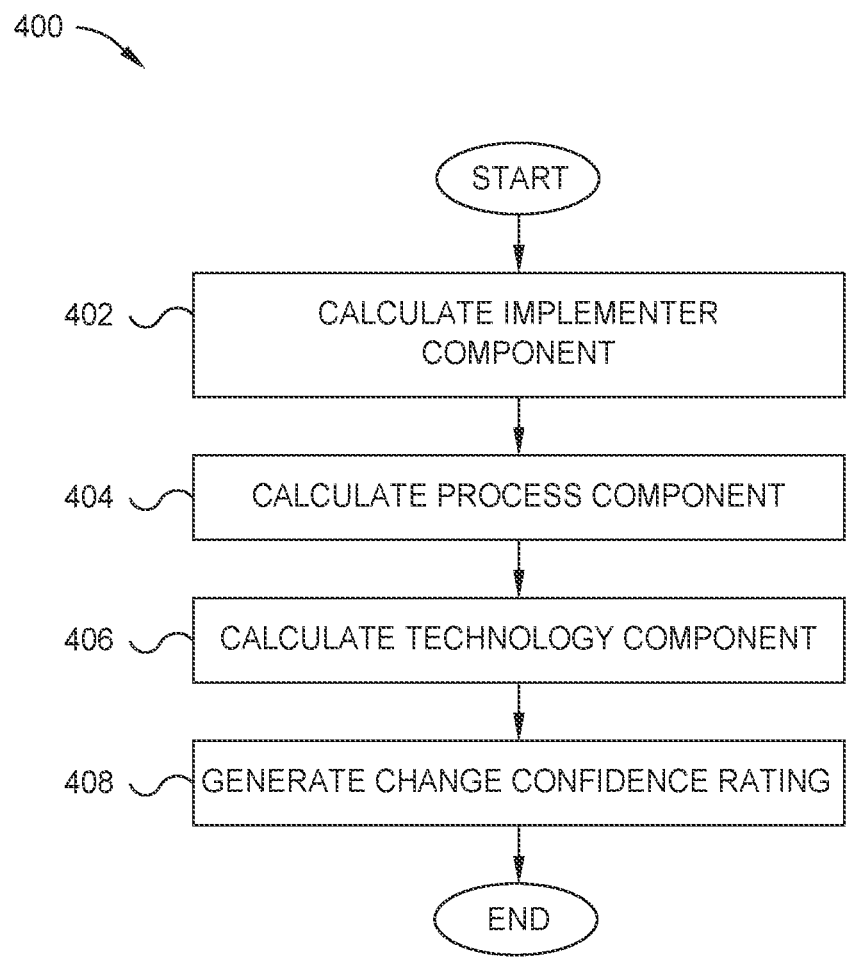
FIG. 4A is a flowchart illustrating an exemplary method for generating a technology change confidence rating, according to one embodiment.

FIG. 4A is a flowchart 400 illustrating an exemplary method for generating a technology change confidence rating, according to one embodiment. In an embodiment, the flowchart 400 corresponds with block 308 illustrated in FIG. 3. At block 402 a confidence rating service (e.g., the confidence rating service 112 illustrated in FIGS. 1-2) calculates an implementer component for a change confidence rating. For example, the confidence rating service can use change coordinator information (e.g., current and/or historical information about the person or entity coordinating the change) and/or task implementer information (e.g., current and/or historical information about the person or entity actually implementing the change) to calculate the implementer component. This is discussed further below with regard to FIG. 5.

At block 404, a confidence rating service calculates a process component for the change confidence rating. For example, the confidence rating service can use change coordinator information (e.g., current and/or historical) and approval group information (e.g., current and/or historical) to calculate the process component. This is discussed further below with regard to FIG. 6.

At block 406 a confidence rating service calculates a technology component for the change confidence rating. For example, the confidence rating service can use information about the technology item being changed (e.g., current and/or historical information) and information about related technology items (e.g., historical information) to calculate the technology component. This is discussed further below with regard to FIG. 7.

At block 408, the confidence rating service generates the change confidence rating. In an embodiment, the confidence rating service uses some, or all, of the implementer component, the process component, and the technology component to generate the change confidence rating. For example, the change confidence rating can be a number from 0 to 100 (e.g., with a lower value representing a higher risk of incidents or failure in a given technology change). As discussed below in relation to FIGS. 5-7, the implementer component, process component, and technology component can each be a value representing a portion of the change confidence rating. This is merely one example, and the confidence rating service can use any subset of the implementer component, the process component, and the technology component, to generate the change confidence rating. For example, one or more of the implementer component, the process component, and/or the technology component, can be zeroed out and provide no contribution to the change confidence rating.

In an embodiment, the implementer component, process component, and technology component are combined and weighted to determine the change confidence rating. For example, each component can be generated separately, and the components can be combined to determine the change confidence rating. Each component can be weighted equally, or any individual component, or combination of components, can be weighted more, or less, than other components. For example, each component can be assigned a score from 0-33, and can be weighted equally to generate a change confidence rating from 0-100. This is merely one example, and the change confidence rating can be a different number score (e.g., a range other than from 0 to 100, or with higher numbers representing higher risk), or another suitable value (e.g., an encoded or representative value).

Further, in an embodiment, a bonus value (e.g., a bonus point) can be added to the change confidence rating. For example, a technology change being analyzed for a change confidence rating can be assumed to be undergoing the appropriate process for technology change review. The mere presence of the change in a list of pending changes (e.g., the pending changes 122 illustrated in FIG. 1) can slightly increase confidence in the technology change, as opposed to changes that did not undergo review at all prior to implementation, and can reduce the chances that the technology change is high risk.

Figure 4B:
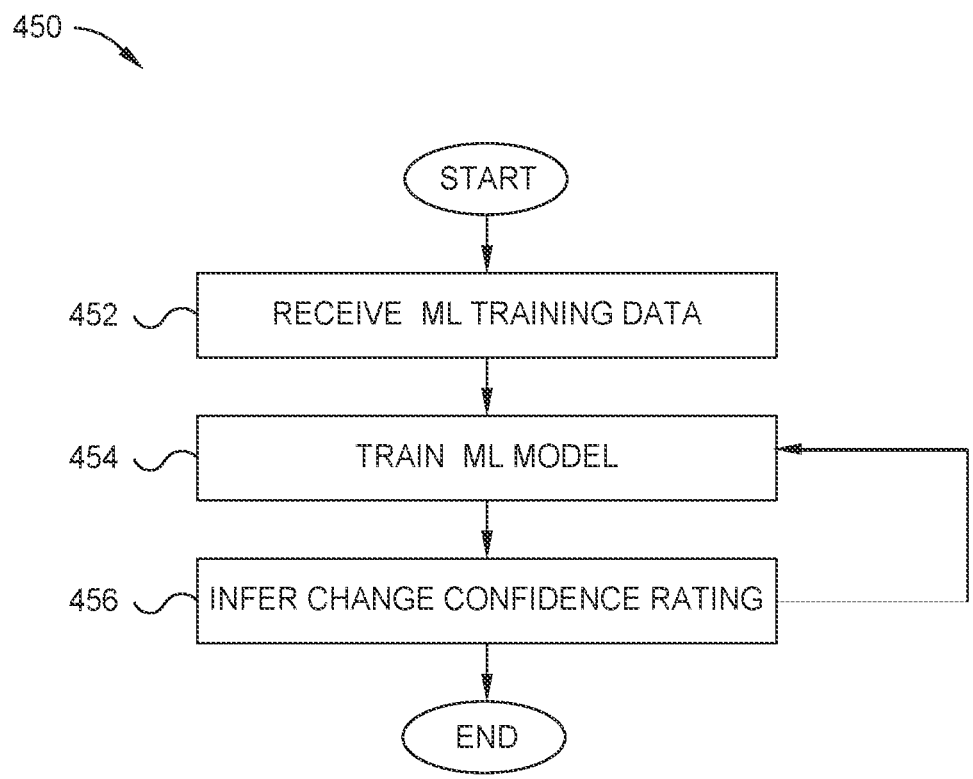
FIG. 4B is another flowchart further illustrating an exemplary method for generating a technology change confidence rating, according to one embodiment.

FIG. 4B is a flowchart 450 further illustrating an exemplary method for generating a technology change confidence rating, according to one embodiment. In an embodiment, FIG. 4B provides an alternative, or additional, embodiment corresponding to block 308 in FIG. 3. At block 452 a confidence rating service (e.g., the confidence rating service 112 illustrated in FIGS. 1-2) receives ML training data. For example, the confidence rating service can retrieve prior change information (e.g., the prior changes 126 illustrated in FIG. 1). This prior change information can be used to train a suitable ML model (e.g., the confidence rating ML model 114 illustrated in FIG. 1).

As discussed above, the prior change information can at least partially overlap with the change histories discussed above in relation to block 306 in FIG. 3 (e.g., the change histories 124 illustrated in FIG. 1). For example, the change histories can include historical information relating to pending changes for which a change confidence rating is being generated. The prior change information can include records of the success, or failure, of prior changes, including the characteristics of the changes, and can be used to train the ML model.

At block 454, the confidence rating service trains the ML model. In an embodiment, the confidence rating service can use the prior change information to train the ML model to infer a change confidence rating from information about a given change, and historical information about the change. For example, the confidence rating service (or another suitable service) can generate one or more feature vectors from the prior change information, and use the feature vectors to train the ML model to identify a change confidence rating for prior technology changes (e.g., based on the data about the change known at the time the change was implemented, any incidents generated by the change, and the success or failure of the change). In an embodiment, any suitable ML model can be used, including a neural network (e.g., a convolutional neural network, a recurrent neural network, a long-short term memory neural network, or any other suitable deep or non-deep neural network), a regression model (e.g., a linear regression model, a decision tree model, or a random forest model), or any other suitable ML model.

At block 456, the confidence rating service infers the change confidence rating. In an embodiment, the confidence rating service uses the ML model trained at block 454 to infer the change confidence rating. For example, the confidence rating can provide information about a pending change to the trained ML model, including details of the pending change and historical information relating to the pending change, and the ML model can infer a change confidence rating for the pending change. In some embodiments, after the ML model is trained, blocks 452 and 454 may be omitted, and change confidence ratings for new changes can be inferred using the trained ML model.

In an embodiment, the trained ML model infers an implementer component, a process component, and a technology component based on the information about the pending change. For example, the trained ML model can infer a score for each of these components, can infer an appropriate weighting for each component, and can combine these scores to generate a change confidence rating. This is merely one example, and the trained ML model can infer more, or fewer, component scores, or can infer the change confidence rating directly without inferring component scores. Further, in an embodiment, the confidence rating service can use the confidence rating generated at block 456 to further train and refine the ML model (e.g., using continual learning).

Figure 5:
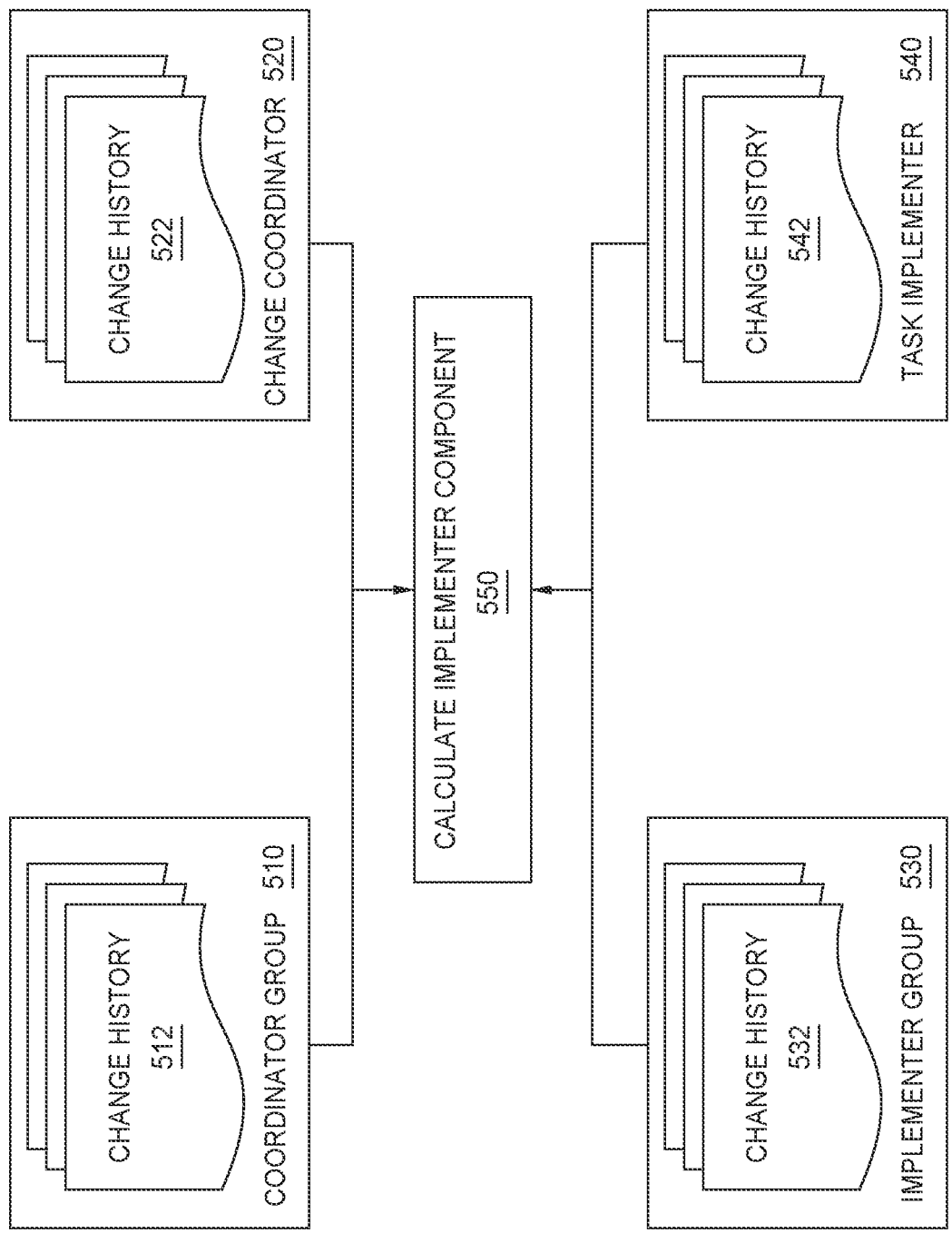
FIG. 5 illustrates an exemplary method for calculating an implementer component for generating a technology change confidence rating, according to one embodiment.

FIG. 5 illustrates an exemplary method for calculating an implementer component for generating a technology change confidence rating, according to one embodiment. In an embodiment, FIG. 5 corresponds with block 402 illustrated in FIG. 4A. At block 550 a confidence rating service (e.g., the confidence rating service 112 illustrated in FIGS. 1-2) calculates the implementer component. In an embodiment, the confidence rating service uses coordinator group information 510 (including change history information 512), change coordinator information 520 (including change history information 522), implementer group information 530 (including change history information 532), and task implementer information 540 (including change history information 542). In an embodiment, an implementer group is a group of people (e.g., IT professionals) tasked with implementing the technology change, and a coordinator group is a group of people (e.g., IT professionals) tasked with managing the overall implementation of the technology change. The implementer group and the coordinator group can both be defined prior to generating the change confidence rating, and can overlap in whole or in part. This is merely an example, and the confidence rating service can use a subset of this information, or additional information, to generate the change confidence rating. Further, each of these categories of information can be weighted to provide greater, or lesser, impact on the change confidence rating. The categories of information may be weighted with pre-defined weights or the weights may be dynamically set.

For example, as discussed above, in an embodiment, a change coordinator is an employee (e.g., an IT professional) in charge of managing the overall implementation of the technology change for which a change confidence rating is being generated. The change coordinator information 520 includes change history information 522 about that change coordinator's past technology changes, including one or more of change volume (e.g., number of prior changes), historical changes causing incidents, historical change success rate, or fatigue factor, discussed further below. These are merely examples, and any suitable information can be used.

In an embodiment, the change coordinator information 520 can be used to both positively, and negatively, impact the overall score for the implementer component of the change confidence rating. For example, a higher volume of prior changes can positively impact (e.g., increase) the score, because it indicates experience with technology changes. Further, the relative risk of prior changes could impact the score (e.g., experience with high risk changes could have a greater positive impact than experience with lower risk changes). By contrast a high number of changes causing incidents, or a low change success rate, can negatively impact (e.g., decrease) the score, because it could indicate a lack of training or performance issues. Further, the significance of prior incidents can impact the score (e.g., prior major incidents could have a more significant negative impact on the score than relatively minor incidents).

In an embodiment, the fatigue factor can indicate an anticipated risk due to the level of mental or physical strain on the change coordinator. The fatigue factor can consider the number of expected changes for the change coordinator that are planned to be close in time to the change at issue. For example, the fatigue factor can negatively impact the change confidence rating if the change coordinator is expected to have a relatively large number (e.g., meeting or exceeding a threshold number) of changes in a short time period before, or after, the change at issue.

In an embodiment, a coordinator group is the group to which the change coordinator belongs. The coordinator group information 510 includes change history information 512 about past technology changes for all members of that coordinator group (e.g., the change coordinator and their colleagues), including change volume (e.g., number of prior changes), historical changes causing incidents, and historical change success rate. These are merely examples, and any suitable information can be used.

In an embodiment, the coordinator group information 510 can also be used to both positively, and negatively, impact the overall score for the implementer component of the change confidence rating. For example, a higher volume of prior changes for the coordinator group can positively impact (e.g., increase) the score, because it indicates experience with technology changes. Further, the relative risk of prior changes could impact the score (e.g., experience with high risk changes could have a greater positive impact than experience with lower risk changes). By contrast a high number of changes causing incidents, or a low change success rate, can negatively impact (e.g., decrease) the score, because it could indicate a lack of training for the group or performance issues within the group. Further, the significance of prior incidents can impact the score (e.g., prior major incidents could have a more significant negative impact on the score than relatively minor incidents).

In an embodiment, a task implementer is an employee (e.g., an IT professional) in charge of implementing the technology change for which a change confidence rating is being generated (e.g., as opposed to a change coordinator who is in charge of coordinating the change). The task implementer information 540 includes change history information 542 about that task implementer's past technology changes, including change volume (e.g., number of prior changes), historical changes causing incidents, historical change success rate, and fatigue factor. These are merely examples, and any suitable information can be used.

In an embodiment, the task implementer information 540 can be used to both positively, and negatively, impact the overall score for the implementer component of the change confidence rating. For example, a higher volume of prior changes can positively impact (e.g., increase) the score, because it indicates experience with technology changes. Further, the relative risk of prior changes could impact the score (e.g., experience with high risk changes could have a greater positive impact than experience with lower risk changes). By contrast a high number of changes causing incidents, or a low change success rate, can negatively impact (e.g., decrease) the score, because it could indicate a lack of training or performance issues. Further, the significance of prior incidents can impact the score (e.g., prior major incidents could have a more significant negative impact on the score than relatively minor incidents).

In an embodiment, an implementer group is the group to which the task implementer belongs. The implementer group information 530 includes change history information 532 about past technology changes for all members of that implementer group (e.g., the task implementer and their colleagues), including change volume (e.g., number of prior changes), historical changes causing incidents, and historical change success rate. These are merely examples, and any suitable information can be used.

In an embodiment, the implementer group information 530 can also be used to both positively, and negatively, impact the overall score for the implementer component of the change confidence rating. For example, a higher volume of prior changes for the implementer group can positively impact (e.g., increase) the score, because it indicates experience with technology changes. Further, the relative risk of prior changes could impact the score (e.g., experience with high risk changes could have a greater positive impact than experience with lower risk changes). By contrast a high number of changes causing incidents, or a low change success rate, can negatively impact (e.g., decrease) the score, because it could indicate a lack of training for the group or performance issues within the group. Further, the significance of prior incidents can impact the score (e.g., prior major incidents could have a more significant negative impact on the score than relatively minor incidents).

Figure 6:
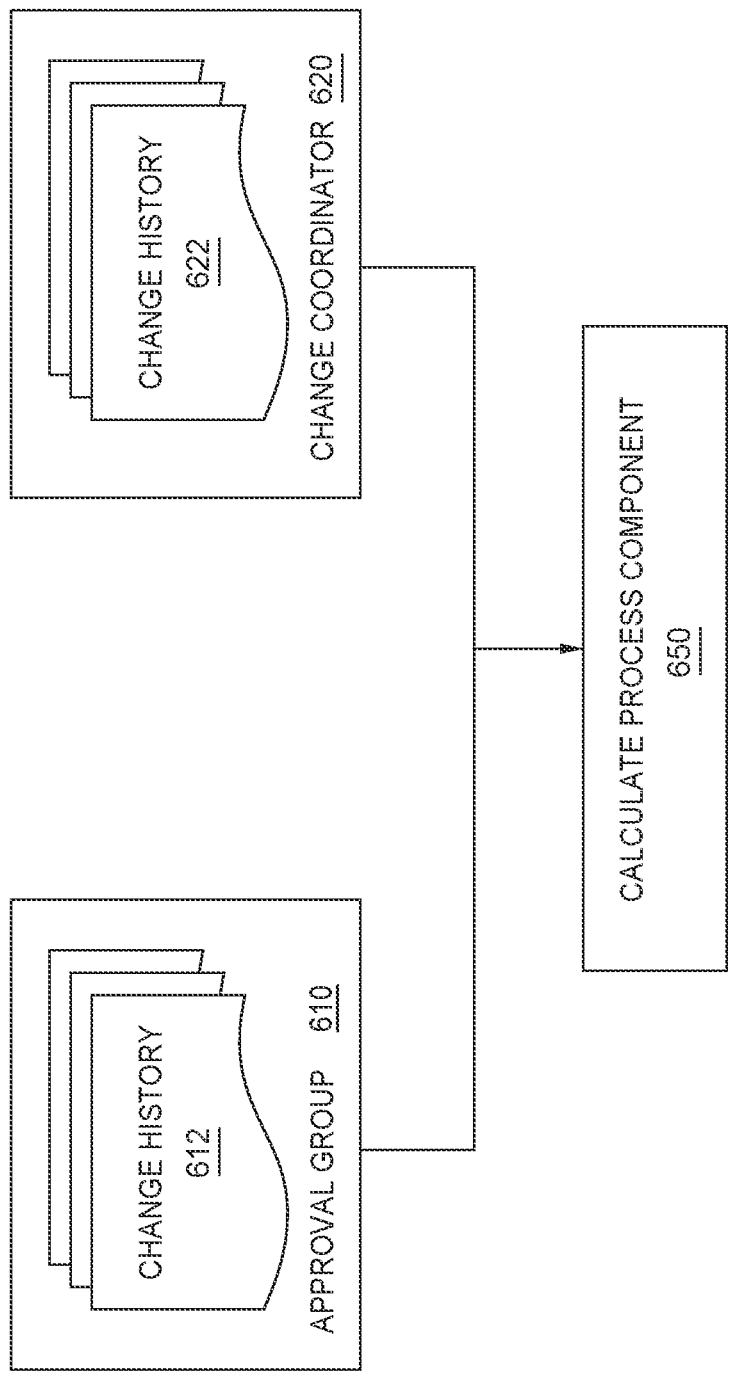
FIG. 6 illustrates an exemplary method for calculating a process component for generating a technology change confidence rating, according to one embodiment.

FIG. 6 illustrates an exemplary method for calculating a process component for generating a technology change confidence rating, according to one embodiment. In an embodiment, FIG. 6 corresponds with block 404 illustrated in FIG. 4A. At block 650 a confidence rating service (e.g., the confidence rating service 112 illustrated in FIGS. 1-2) calculates the process component. In an embodiment, the confidence rating service uses approval group information 610 (including change history information 612) and change coordinator information 620 (including change history information 622). In an embodiment, the change coordinator information 620 used to calculate the process component includes different information about the change coordinator than the change coordinator information 520 used to calculate the implementer component. For example, the confidence rating service can use change success information for the change coordinator to calculate the implementer component (e.g., at block 550) and not the process component, and can use change revert codes for the change coordinator to calculate the process component (e.g., at block 650) and not the implementer component. This is merely an example, and the confidence rating service can use a subset of the approval group and change coordinator information, or additional information, to generate the change confidence rating. Further, each of these categories of information can be weighted to provide greater, or lesser, impact on the change confidence rating.

For example, in an embodiment, an approval group is a group of employees (e.g., a group of IT professionals) in charge of reviewing the technology change for which a change confidence rating is being generated. The approval group information 610 includes change history information 612 about that approval group's past technology changes, including change volume (e.g., number of prior changes), revert code use (e.g., instances in which the approval group has sent the scheduled technology change back to the implementer or coordinate for revision), lead time (e.g., lead time provided to the approval group before a scheduled technology change), process exceptions (e.g., instances in which the approval group has gone outside the preferred process for technology changes), and prior change success rate.

In an embodiment, the approval group information 610 can be used to both positively, and negatively, impact the overall score for the process component of the change confidence rating. For example, a higher volume of prior changes can positively impact (e.g., increase) the score, because it indicates experience with technology changes. Further, the relative risk of prior changes could impact the score (e.g., experience with high risk changes could have a greater positive impact than experience with lower risk changes). By contrast a relatively short lead time, the use of revert codes, and process exceptions (e.g., process bypass requests or process errors), can negatively impact the process component score.

As discussed above, in an embodiment, a change coordinator is an employee (e.g., an IT professional) in charge of coordinating the technology change for which a change confidence rating is being generated. In an embodiment, the change coordinator is the same in FIGS. 5 and 6, but the change coordinator information 620 can include additional information compared with the change coordinator information 520 illustrated in FIG. 5. For example, the change coordinator information 620 includes change history information 622 about that change coordinator's past technology changes, including change volume (e.g., number of prior changes), revert code use (e.g., instances in which the change coordinator has had scheduled changes returned for revision, prior to implementation), lead time (e.g., lead time provided by the change coordinator before a scheduled technology change), process exceptions (e.g., instances in which the change coordinator has gone outside the preferred process for technology changes), prior change success rate, and non-close change records (e.g., change records which are not considered in the change history information 622 because the records have not been closed).

In an embodiment, the change coordinator information 620 can be used to both positively, and negatively, impact the overall score for the process component of the change confidence rating. For example, a higher volume of prior changes can positively impact (e.g., increase) the score, because it indicates experience with technology changes. Further, the relative risk of prior changes could impact the score (e.g., experience with high risk changes could have a greater positive impact than experience with lower risk changes). By contrast a relatively short lead time, the use of revert codes, process exceptions (e.g., process bypass requests or process errors), and failures to close prior change records, can negatively impact the process component score.

Figure 7:
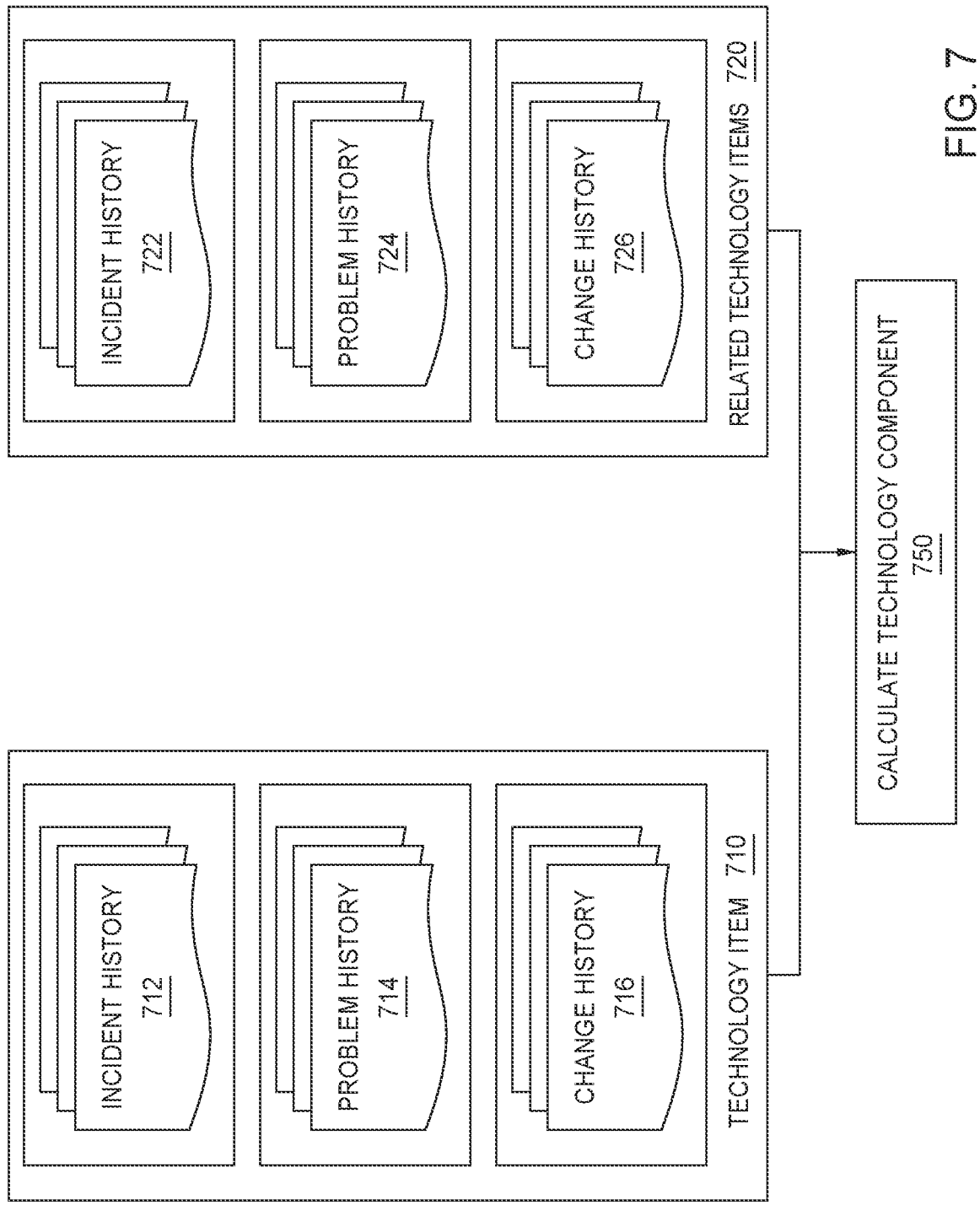
FIG. 7 illustrates an exemplary method for calculating a technology component for generating a technology change confidence rating, according to one embodiment.

FIG. 7 illustrates an exemplary method for calculating a technology component for generating a technology change confidence rating, according to one embodiment. In an embodiment, FIG. 7 corresponds with block 406 illustrated in FIG. 4A. At block 750 a confidence rating service (e.g., the confidence rating service 112 illustrated in FIGS. 1-2) calculates the technology component. In an embodiment, the confidence rating service uses technology item information 710 (including incident history information 712, problem history information 714 and change history information 716) and related technology item information 720 (including incident history information 722, problem history information 714 and change history information 716). This is merely an example, and the confidence rating service can use a subset of this information, or additional information, to generate the change confidence rating. Further, each of these categories of information can be weighted to provide greater, or lesser, impact on the change confidence rating.

For example, in an embodiment, a technology item is the technology item being changed (e.g., a particular item of hardware or software being added, removed, replaced, or upgraded). The technology item information 710 includes one or more of incident history information 712, problem history information 714, or change history information 716 about that technology item (e.g., that specific hardware item or version of software item). In an embodiment, incident history information 712 includes past incidents with that technology item (e.g., past incidents with that specific hardware item or version of software), problem history information 714 includes past problems with that technology item (e.g., open issues for that model of hardware or version of software), and change history information 716 includes change success rate for that technology item (e.g., percentage of changes for that model of hardware or version of software that were successful). For example, incidents described in the incident history information 712 can relate to unplanned interruption to an IT service, or quality reduction of an IT service, while problems described in the problem history information 714 can relate to causes or potential causes of incidents.

In an embodiment, the technology item information 710 can be used to both positively, and negatively, impact the overall score for the technology component of the change confidence rating. For example, a high change success rate can positively impact (e.g., increase) the score, because it indicates that the item can typically be changed successfully. Further, the relative risk of prior changes could impact the score (e.g., success with high risk changes could have a greater positive impact than success with lower risk changes). By contrast a relatively high number of incidents or problems for the technology item can negatively impact the technology component score.

In an embodiment, a related technology item is an item that is related to the item being changed. For example, a particular hardware item could be one of a line of items. Hardware items in the same line are related to the item being changed. As another example, a particular software item could be one of multiple versions of a given software program. Additional versions of the software item are related to the item being changed. The related technology item information 720 includes one or more of incident history information 722 about the related technology items having past incidents, problem history information 724 about the related technology items having past problems, and change history information 726 about past change success rate for the related items.

In an embodiment, the related technology item information 720 can be used to both positively, and negatively, impact the overall score for the technology component of the change confidence rating. For example, a high change success rate can positively impact (e.g., increase) the score, because it indicates that related items can typically be changed successfully. Further, the relative risk of prior changes could impact the score (e.g., success with high risk changes could have a greater positive impact than success with lower risk changes). By contrast a relatively high number of incidents or problems for the related technology items can negatively impact the technology component score.

Figure 8:
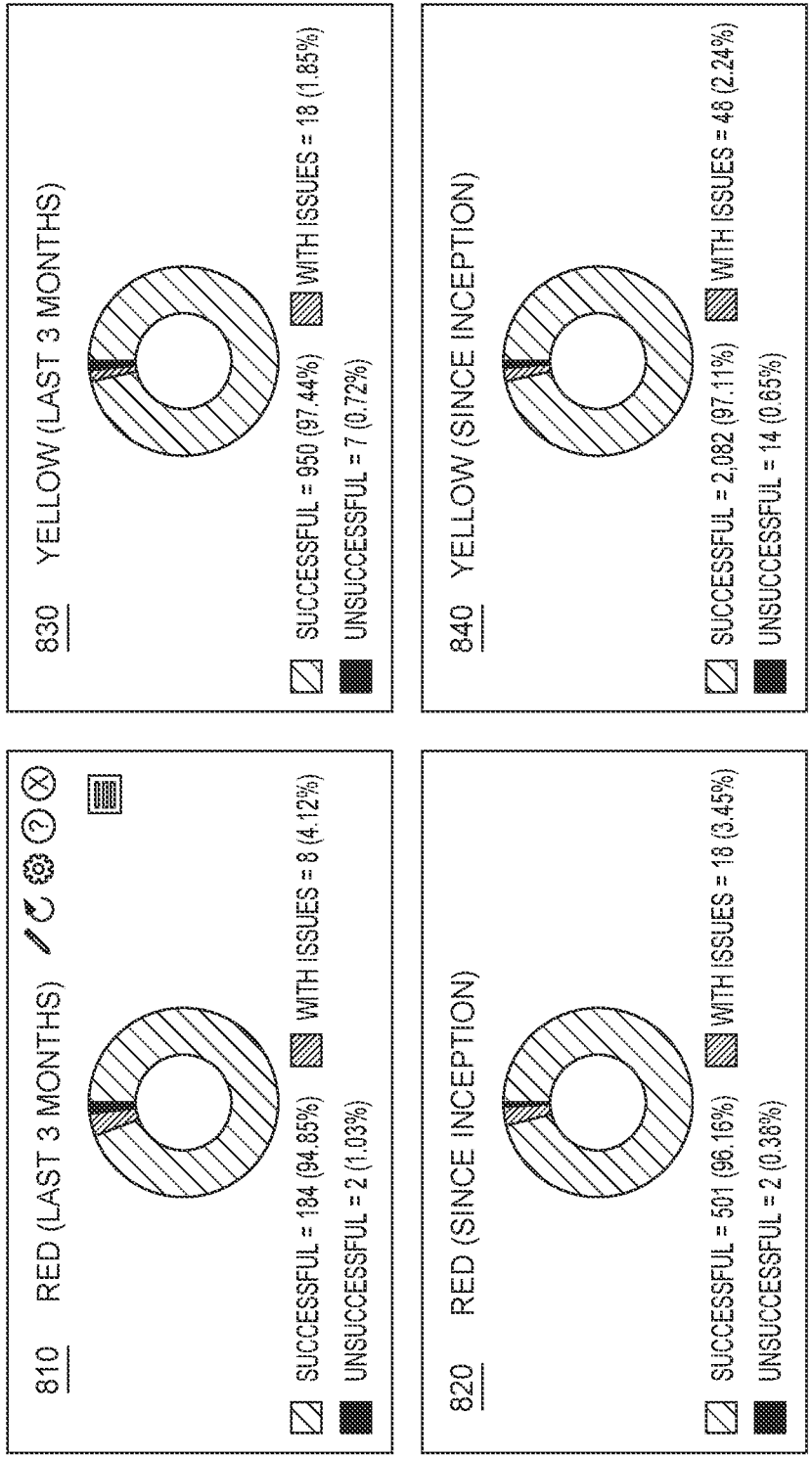
FIG. 8 illustrates a dashboard for tracking application of a technology change confidence rating, according to one embodiment.

FIG. 8 illustrates a dashboard 800 for tracking application of a technology change confidence rating, according to one embodiment. In an embodiment, the dashboard 800 illustrates the relative success of technology changes designated red, and yellow, prior to implementation (e.g., using one or more of the techniques illustrated above at FIGS. 3-7). In an embodiment, the dashboard 800 is one example of a suitable user interface for presenting information about change confidence ratings (e.g., the user interface 130 illustrated in FIG. 1). For example, the dashboard 800 illustrates the real-world accuracy of the change confidence ratings, but describing whether technology changes designated as high risk have incidents or are unsuccessful at a higher rate than technology changes designated as medium or low risk.

For example, the diagram 810 illustrates the relative success rate of changes designated as "RED", or high risk, in the previous three months. The diagram 820 illustrates the relative success rate of changes designated as "RED", or high risk, since inception. The diagram 830 illustrates the relative success rate of changes designated as "YELLOW", or medium risk, in the previous three months. The diagram 840 illustrates the relative success rate of changes designated as "YELLOW", or medium risk, since inception. In an embodiment, each diagram 810, 820, 830, and 840 reflects technology changes that closed successfully, unsuccessfully, or with issues (e.g., partially successfully).

In an embodiment, as discussed above, a change confidence rating can be generated with a numeric value (e.g., between 0 and 100). This numeric value can be designated as "RED", or high risk, if it falls below a first threshold (e.g., numeric values below 75, where 75 is the first threshold). Further, the numeric value can be designated as "YELLOW", or medium risk, if it falls above the first threshold but below a second threshold (e.g., numeric values from 75 to 90, where 75 is the first threshold and 90 is the second threshold). The numeric value can be designated as "GREEN", or low risk, if it falls above second threshold value (e.g., numeric values above 90, where 90 is the second threshold). In an embodiment, these are merely examples and the first and second thresholds can be configured at any time, including by an administrator prior to implementation, or dynamically during implementation.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    training a machine learning model on historical technology change data relating to a plurality of technology items in a technology infrastructure, the historical technology change data comprising data relating to at least one of:
        (i) prior technology changes applied to the plurality of technology items,
        (ii) incident data generated by the prior technology changes, and
        (iii) success or failure metrics associated with the prior technology changes;
    identifying a planned change to a technology item in the technology infrastructure;
    generating, by a controller and using the machine learning model, a plurality of components of a change confidence rating for a risk of failure for the planned change to the technology item, wherein the plurality of components comprises:
        an implementer component that is determined based on results of the prior technology changes by an implementer or a coordinator of the planned change,
        a process component that is determined based on prior process problems relating to the coordinator of the planned change or an approval group for the planned change, and
        a technology component that is determined based on the results of the prior technology changes relating to the technology item or a related technology item;
    generating the change confidence rating based on the plurality of components;
    processing the change confidence rating, by the controller automatically and in real-time, to identify one or more characteristics of the planned change that impact the change confidence rating relative to one or more other characteristics of the planned change; and
    modifying, by the controller automatically and based on the change confidence rating and the one or more characteristics, at least one of (i) a time of an implementation of the planned change within the technology infrastructure or (ii) a level of risk that is stored in a repository and associated with one or more users included in a user group to which the planned change is applied.

2. The method of claim 1, wherein the technology item comprises a hardware item or software item in an information technology (IT) infrastructure.

3. The method of claim 1, wherein the implementer component is determined based on at least one of a change volume, a number of historical changes causing incidents, a historical change success rate, or a fatigue factor associated with the implementer or the coordinator of the planned change.

4. The method of claim 1, wherein the implementer component is based on the results of the prior technology changes for all of:
    (i) the coordinator tasked with managing the implementation of the planned change,
    (ii) a coordinator group of people that includes the coordinator,
    (iii) the implementer of the planned change, and
    (iv) an implementer group of people that includes the implementer.

5. The method of claim 1, wherein the process component is based on at least one of a change volume, revert codes, a lead time, process exceptions, prior change success rates, or non-closed change records relating to the coordinator of the planned change or the approval group for the planned change.

6. The method of claim 1, wherein:
    the technology component is based on the results of the prior technology changes relating to the technology item and the related technology item, and
    the related technology item is provided by a same entity as the technology item.

7. The method of claim 1, wherein:
    the technology component is based on incident history information, problem history information, and change history information associated with the related technology item or the technology item.

8. The method of claim 1, further comprising generating an alert indicating a high level of risk based on the change confidence rating.

9. A non-transitory computer-readable medium containing computer program code that, when executed by operation of one or more computer processors, performs operations comprising:
    training a machine learning model on historical technology change data relating to a plurality of technology items in a technology infrastructure, the historical technology change data comprising data relating to at least one of:

(i) prior technology changes applied to the plurality of technology items,
(ii) incident data generated by the prior technology changes, and
(iii) success or failure metrics associated with the prior technology changes;

identifying a planned change to a technology item in the technology infrastructure;

generating, by a controller and using the machine learning model, a plurality of components of a change confidence rating for a risk of failure for the planned change to the technology item, wherein the plurality of components comprises:

an implementer component that is determined based on results of the prior technology changes by an implementer or a coordinator of the planned change, a process component that is determined based on prior process problems relating to the coordinator of the planned change or an approval group for the planned change, and a technology component that is determined based on results of prior technology changes relating to the technology item or a related technology item;

generating the change confidence rating based on the plurality of components;

processing the change confidence rating, by the controller automatically and in real-time, to identify one or more characteristics of the planned change that impact the change confidence rating relative to one or more other characteristics of the planned change; and modifying, by the controller automatically and based on the change confidence rating and the one or more characteristics, at least one of (i) a time of an implementation of the planned change within the technology infrastructure or (ii) a level of risk that is stored in a repository and associated with one or more users included in a user group to which the planned change is applied.

10. The non-transitory computer-readable medium of claim 9, wherein the technology item comprises a hardware item or software item in an information technology (IT) infrastructure.

11. The non-transitory computer-readable medium of claim 9, wherein the implementer component is determined based on at least one of a change volume, a number of historical changes causing incidents, a historical change success rate, or a fatigue factor associated with the implementer or the coordinator of the planned change.

12. The non-transitory computer-readable medium of claim 9, wherein:
the implementer component is based on the results of the prior technology changes for all of:
(i) the coordinator tasked with managing the implementation of the planned change,
(ii) a coordinator group of people that includes the coordinator,
(iii) the implementer of the planned change, and
(iv) an implementer group of people that includes the implementer,
the process component is based on the prior process problems relating to the coordinator of the planned change and the approval group for the planned change,
the technology component is based on the results of the prior technology changes relating to the technology item and the related technology item, and
the related technology item is provided by a same entity as the technology item.

13. A system, comprising:
a computer processor; and
a memory having instructions stored thereon which, when executed on the computer processor, performs operations comprising:

training a machine learning model on historical technology change data relating to a plurality of technology items in a technology infrastructure, the historical technology change data comprising data relating to at least one of:
(i) prior technology changes applied to the plurality of technology items,
(ii) incident data generated by the prior technology changes, and
(iii) success or failure metrics associated with the prior technology changes;

identifying a planned change to a technology item in the technology infrastructure;

generating, by a controller and using the machine learning model, a plurality of components of a change confidence rating for a risk of failure for the planned change to the technology item, wherein the plurality of components comprises:

an implementer component that is determined based on results of the prior technology changes by an implementer or a coordinator of the planned change, a process component that is determined based on prior process problems relating to the coordinator of the planned change or an approval group for the planned change, and a technology component that is determined based on the results of the prior technology changes relating to the technology item or a related technology item;

generating the change confidence rating based on the plurality of components;

processing the change confidence rating, by the controller automatically and in real-time, to identify one or more characteristics of the planned change that impact the change confidence rating relative to one or more other characteristics of the planned change; and modifying, by the controller automatically and based on the change confidence rating and the one or more characteristics, at least one of (i) a time of an implementation of the planned change within the technology infrastructure or (ii) a level of risk that is stored in a repository and associated with one or more users included in a user group to which the planned change is applied.

14. The system of claim 13, wherein the technology item comprises a hardware item or software item in an information technology (IT) infrastructure.

15. The system of claim 13, wherein the operations further comprise generating a user interface illustrating a risk level for the planned change.

16. The system of claim 15, wherein the operations further comprise initiating a supplemental review of the planned change.

* * * * *